(12) United States Patent
Fields et al.

(10) Patent No.: US 11,186,376 B2
(45) Date of Patent: Nov. 30, 2021

(54) AERIAL DELIVERY SYSTEM

(71) Applicants: THE CURATORS OF THE UNIVERSITY OF MISSOURI, Columbia, MO (US); THE UNITED STATES OF AMERICA, AS REPRESENTED BY THE SECRETARY OF THE NAVY, Arlington, VA (US); The Government of the United States, as represented by the Secretary of the Army, Natick, MA (US)

(72) Inventors: Travis D. Fields, Kansas City, MO (US); Oleg A. Yakimenko, Monterey, CA (US); Richard Benney, Natick, MA (US)

(73) Assignees: The Government of the United States, as represented by the Secretary of the Army, Natick, MA (US); The Curators of the University of Missouri, Columbia, MO (US); The United Sates of America, as represented by the Secretary of the Navy, Arlington, VA (US)

( * ) Notice: Subject to any disclaimer, the term of this patent is extended or adjusted under 35 U.S.C. 154(b) by 345 days.

(21) Appl. No.: 16/292,944

(22) Filed: Mar. 5, 2019

(65) Prior Publication Data

US 2019/0270522 A1 Sep. 5, 2019

Related U.S. Application Data

(60) Provisional application No. 62/638,514, filed on Mar. 5, 2018.

(51) Int. Cl.
B64D 17/34 (2006.01)
B64D 17/62 (2006.01)
B64D 17/04 (2006.01)

(52) U.S. Cl.
CPC ............. *B64D 17/34* (2013.01); *B64D 17/04* (2013.01); *B64D 17/62* (2013.01)

(58) Field of Classification Search
CPC ......... B64D 17/34; B64D 17/04; B64D 17/62
See application file for complete search history.

(56) References Cited

U.S. PATENT DOCUMENTS

| 4,662,589 | A | * | 5/1987 | Allen | ...................... | B64D 19/00 244/142 |
| 6,164,594 | A | * | 12/2000 | Pignol | ................... | B64D 19/02 244/138 A |

(Continued)

OTHER PUBLICATIONS

Potvin, J., et al., "Glide Performance Study of Standard and Hybrid Cruciform Parachutes", 17th AIAA Aerodynamic Decelerator Systems Technology Conference and Seminar, May 19-22, 2003, Monterey, California, copyright 2003 (18 pgs).

(Continued)

*Primary Examiner* — Justin M Benedik
(74) *Attorney, Agent, or Firm* — Stinson LLP

(57) ABSTRACT

An aerial payload delivery system uses a cruciform parachute canopy that is connected to base by plurality of suspension lines including an adjustable control line. A control system includes an actuator to selectively adjust the length of the control line. By adjusting the length of the control line, the parachute can be selectively set to glide or descend substantially vertically subject to wind. In an embodiment, the suspension lines also include a short line and a plurality of long lines. The parachute is set to glide by adjusting the control line to be about the same length as the (Continued)

short line and set to vertically descend by adjusting the length of the control line to differ from the short line.

23 Claims, 3 Drawing Sheets

(56) References Cited

U.S. PATENT DOCUMENTS

| | | | | |
|---|---|---|---|---|
| 6,808,144 | B1 * | 10/2004 | Nicolai | B64C 39/024 |
| | | | | 244/139 |
| 8,851,426 | B1 * | 10/2014 | Fox, Jr. | B64D 17/20 |
| | | | | 244/145 |
| 2007/0205329 | A1 * | 9/2007 | Barish | B64D 19/02 |
| | | | | 244/145 |
| 2007/0272801 | A1 * | 11/2007 | Hilliard | B64D 17/343 |
| | | | | 244/142 |
| 2011/0174931 | A1 * | 7/2011 | Berland | B64D 1/08 |
| | | | | 244/152 |
| 2020/0354066 | A1 * | 11/2020 | Fox, Jr. | B64D 17/18 |

OTHER PUBLICATIONS

Yakimenko, O., et al., Chapter 9 entitled "Control of Non-Gliding Parachute Systems" from book titled "Precision Aerial Delivery Systems: Modeling, Dynamics, and Control", ISBN (print): 978-1-62410-195-3, eISBN: 978-1-62410-196-0, copyright 2015 by the American Institute of Aeronautics and Astronautics, Inc., pp. 601-684 (43 pgs).

* cited by examiner

AERIAL DELIVERY SYSTEM

CROSS-REFERENCE TO RELATED APPLICATION

This application claims priority to U.S. Provisional Patent Application Ser. No. 62/638,514, entitled Guided Parachute System and filed Mar. 5, 2018, which is hereby expressly incorporated by reference in its entirety.

STATEMENT REGARDING FEDERALLY SPONSORED RESEARCH OF DEVELOPMENT

This invention was made with government support under Grant No. W911QY-15-C-0006 awarded by the US Army Natick Soldier Systems Center. The government of the United States has certain rights in the invention.

FIELD

The present disclosure pertains to an aerial delivery system that uses a guided cruciform parachute to deliver a payload to a target location.

BACKGROUND

Aerial delivery operations have been utilized in time-critical missions or hard-to-reach areas for both military and humanitarian relief efforts. However, unguided payloads suspended from parachutes often miss intended landing targets, which can cause substantial collateral damage and civilian casualties. More advanced guided aerial delivery systems, such as autonomous ram-air parafoils, reduce the inherent risks involved with traditional unguided systems by dramatically increasing landing location accuracy through vehicle lateral and longitudinal control. Researchers have developed advanced control techniques such as spoiler-based canopy control, glide slope control, automatic fault detection, and terrain avoidance. However, the increased accuracy and controllability is overshadowed by the substantial cost of the parafoil canopy and guidance unit. The high costs have severely limited the applicability of parafoil vehicles to only the most critical aerial delivery operations.

Alternative strategies for aerial delivery have investigated the utilization of traditional circular canopies in an attempt to reduce the financial burden of parafoil systems while maintaining an acceptable landing location accuracy. The previous efforts can be categorized into two control paradigms: symmetric and asymmetric canopy deformation. Originally proposed in 2011, symmetric canopy deformation requires the parachute to be reversibly reefed during descent, thereby enabling so called Descent Rate Control (DRC). Initially, the DRC method required a curvilinear landing target; however, a time-varying approach was developed to capitalize on the wind conditions at various layers throughout the descent. Field testing of the symmetric control trajectory generation strategy and evaluation of different reversible reefing techniques have demonstrated the feasibility of the technique. In order to achieve acceptable levels of landing location accuracy, the DRC approach requires highly accurate forecast wind data as the vehicle lacks the lateral control. Asymmetric canopy deformation techniques can potentially overcome minor-moderate inaccuracies in wind forecast data because of the rudimentary glide ratios achievable via the canopy deformation. Significant effort has investigated asymmetrically deforming circular parachute systems, most notably, the Affordable Guided Airdrop System (AGAS). The system incorporated pneumatic muscle actuators, and in later versions electromechanical actuators, to extend or contract one or two bridles during descent. The change in length of the risers induce a spin (one actuator active) or horizontal glide (two actuators active). Flight testing demonstrated glide ratios of up to 0.6. The system requires relatively expensive guidance unit to control four actuators.

SUMMARY

In one aspect, an aerial payload delivery system for delivering a payload released from an elevated location to a target location below the elevated location comprises a base configured to support the payload as the delivery system descends from the elevated location. A cruciform parachute canopy is configured to be deployed to an open configuration as the payload delivery system descends from the elevated location. A plurality of suspension lines connecting the base to the canopy to suspend the base from the canopy when the canopy is deployed to the open configuration. Each of the suspension lines has a length extending from the base to the cruciform parachute canopy. The plurality of suspension lines include a control line. A control system comprises an actuator operatively connected to the control line to selectively adjust the length of the control line.

In another aspect, a method of guiding a payload from an elevated location to a target location below the elevated location comprises deploying a cruciform parachute from the elevated location. The payload is connected to the cruciform parachute. A length of a control line of the cruciform parachute that connects a canopy of the cruciform parachute to a base is adjusted to set the cruciform parachute on a glide path toward the target location. The length of the control line is adjusted to cause the cruciform parachute to rotate about a vertical axis when the cruciform parachute is located generally above the target location such that the cruciform parachute will descend substantially vertically generally onto the target location.

Other aspects will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
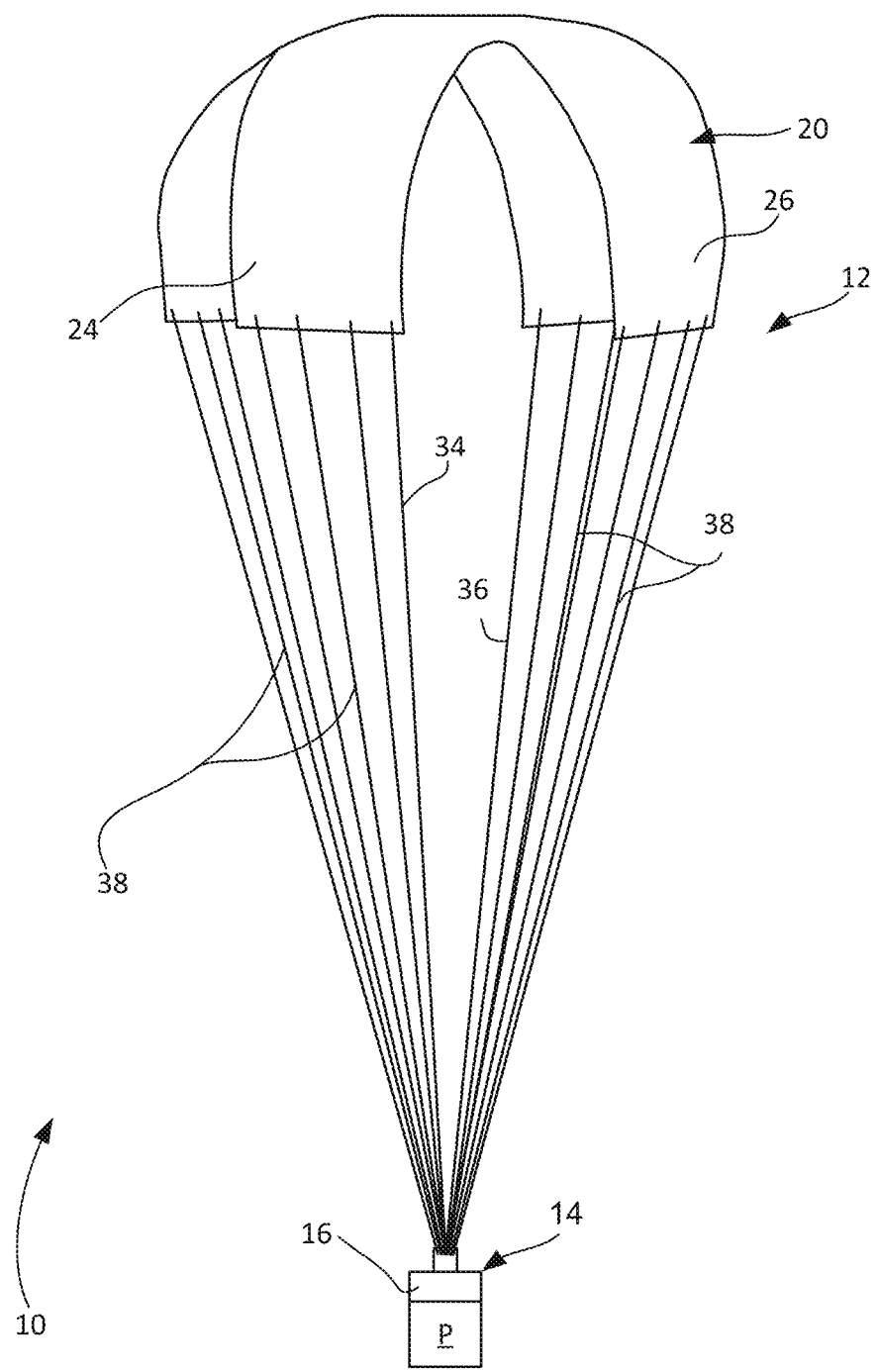
FIG. 1 is a perspective of an aerial delivery system.

Referring to FIG. 1, one embodiment of an aerial payload delivery system is generally indicated at reference number 10. The delivery system 10 comprises a cruciform parachute, generally indicated at 12, and a control unit, generally indicated at 14, that is suspended from the parachute and configured for controlling the delivery system as it descends from an elevated location (e.g., an elevated platform, an airplane, a helicopter, a balloon, etc.). In the illustrated embodiment, the control unit 14 comprises an enclosure 16 that forms a base that supports a payload P. More specifically, the illustrated delivery system 10 is configured to suspend the payload P below the control unit enclosure 16. In one or more embodiments, the delivery system can include a base that supports the payload in other ways (e.g., the payload can be supported atop a base and/or be supported by a base that is separate from the control unit 14). As will be explained in further detail below, the control unit 14 is configured to selectively adjust the parachute 12 between a glide mode and vertical descent mode to guide the delivery system 10 from the elevated location toward a target location below the elevated location (e.g., on the ground). The delivery system 10 can thereby deliver the payload P to the target location.

The parachute 12 comprises a cruciform parachute canopy 20 that is configured to be deployed from a closed configuration (not shown) to an open configuration as shown in FIG. 1. In one or more embodiments, in the closed configuration the canopy 20 is folded or wrapped in such a way that the canopy automatically deploys when the delivery system 10 is released or dropped from the elevated location. However, in certain embodiments the canopy may be closed with a mechanism that initially maintains the canopy 20 in a closed configuration until the mechanism is released, either automatically or in response to a remote signal, to allow the canopy to be deployed at a time after the delivery system 10 is released or dropped. When the canopy 20 is deployed to the open configuration, it creates a large amount of drag on the delivery system 10 that arrests its fall from the elevated location.

Figure 2:
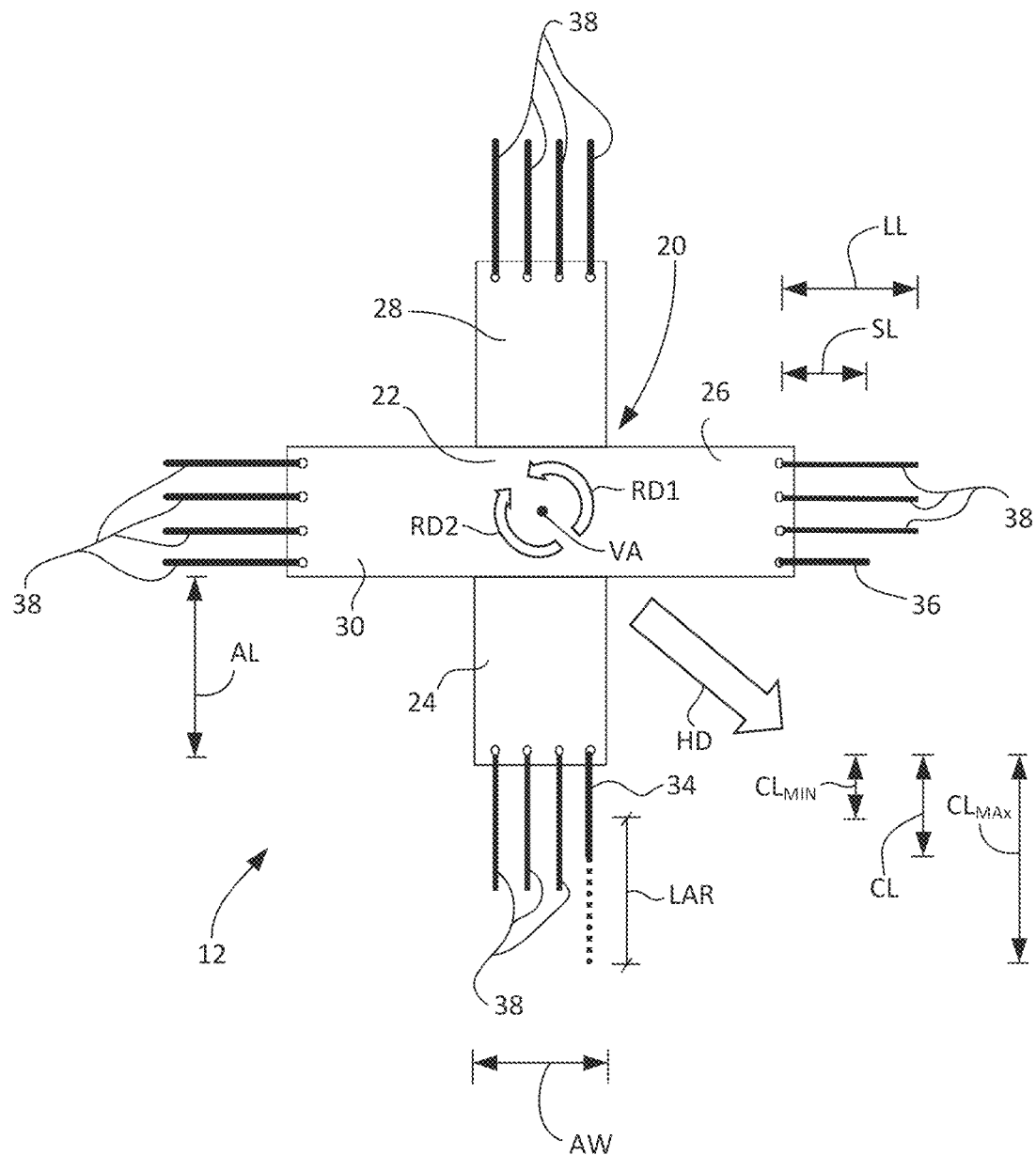
FIG. 2 is a top plan view of a cruciform parachute of the aerial delivery system flattened in a horizontal plane.

Referring to FIG. 2, the canopy 20 includes a central portion 22 and a plurality of arm portions 24, 26, 28, 30 extending outward from the central portion in different directions. In the illustrated embodiment, the canopy includes four arm portions 24, 26, 28, 30 that extend outward from the central portion in generally perpendicular directions. As will be understood by those skilled in the art, the cruciform canopy 20 allows air to flow through the spaces located between the arm portions 24, 26, 28, 30 as the parachute 12 descends from the elevated location.

Each arm portion 24, 26, 28, 30 extends outward from the central portion 22 in a lengthwise direction to a respective free end margin. In the illustrated embodiment, each arm portion 24, 26, 28, 30 has about the same length AL between the central portion 22 and the respective free end margin. Further, each of the illustrated arm portions 24, 26, 28, 30 has about the same width AW. Each arm portion 24, 26, 28, 30 also has two opposite rectilinear corner regions spaced apart along the width AW of the respective arm portion at the respective free end margin. Although the illustrated, cruciform canopy 20 includes four equally sized and spaced, rectangular arm portions 24, 26, 28, 30, other cruciform canopies can have other configurations without departing from the scope of the invention. For example, it is expressly contemplated that the arm portions of the canopies can differ in size and/or have non-rectangular shapes in one or more embodiments.

Referring to FIGS. 1 and 2, a plurality of suspension lines 34, 36, 38 connect the canopy 20 to the control unit 14 (broadly, the base) to suspend the control unit and the payload P from the canopy when the canopy is deployed to the open configuration. Each of the suspension lines 34, 36, 38 is connected to a respective one of the arms 24, 26, 28, 30 and has a respective length CL, SL, LL extending from the control unit 14 to the canopy 20. In the illustrated embodiment, four suspension lines connect each of the arm portions 24, 26, 28, 30 to the control unit 14, but in other embodiments, other numbers of suspension lines can connect one or more arm portions to a base of a parachute.

The illustrated parachute 12 comprises one control line 34, one small line 36, and a plurality of long lines 38. As will be explained in further detail below, the control unit 14 is configured to selectively adjust the length CL of the control line 34 to control the delivery system 10 as it descends from the elevated location. Each of the long lines 38 and the short line 36 has a respective fixed or static length SL, LL. The lengths LL of each of the long lines 38 are longer than the length SL of the short line 36. In one or more embodiments, the lengths LL of each of the long lines are about the same.

The use of suspension lines 34, 36, 38 of differing lengths provides the arm portions 24, 26, 28, 30 of the canopy 20 with different properties. The illustrated canopy comprises two symmetrical arm portions 28, 30, an asymmetrical arm portion 26, and a control arm portion 24 located adjacent to the asymmetrical arm portion. As will be explained in further detail below, when the parachute 12 is deployed, the symmetrical arm portions 28, 30 are configured to be deformed by drag to have substantially identical shapes. The asymmetrical arm portion 26, however, is configured to be deformed by drag to have a different shape than the symmetrical arm portions 28, 30. The control unit 14 is configured to selectively adjust the drag-induced shape of the control arm portion 24 to control the movement of the delivery system 10.

In the illustrated embodiment, each symmetrical arm portion 28, 30 is connected to the control unit 14 by four long lines 38. The four long lines 38 are connected to the end margin of each symmetrical arm portion 28, 30 at generally equally spaced locations along the width AW of the respective arm portion. When the parachute 12 is deployed, drag deforms the two symmetrical arm portions to have substantially identical shapes that are offset 90° from one another about a vertical axis VA of the parachute (see FIG. 1). For example, in one or more embodiments, the curvature of each of the opposite lengthwise edge margins of each symmetrical arm portion 28, 30 is about the same.

In the illustrated embodiment, the asymmetrical arm portion 26 is connected to the control unit 14 by three long lines 38 and one short line 36. In certain embodiments, the asymmetrical arm portion can be connected to a base by other numbers of long lines in addition to a short line. The short line 36 is connected to the asymmetrical arm portion 26 at the corner region located immediately adjacent to the control arm portion 24, and the three long lines 38 are connected to the end margin of the asymmetrical arm portion at connection points that are equally spaced apart widthwise of the arm portion. When the parachute 12 is deployed, drag deforms the asymmetrical arm portion 26 to a different shape than the symmetrical arm portions 28, 30. Whereas the curvature of each lengthwise edge margin of each symmetrical arm portion 38 is about the same, the curvatures of the two lengthwise edge margins of the asymmetrical arm portion 26 differ. For example, in one or more embodiments, the lengthwise edge margin of the asymmetrical arm portion 26 adjacent the short line 36 bends more sharply toward the vertical axis VA than the opposite lengthwise edge margin of the asymmetrical arm portion. In certain embodiments, along at least portions of the height of the deployed parachute 12, the lengthwise edge margin of the asymmetrical arm portion 26 adjacent the short line 36 is located closer to the vertical axis VA than the opposite lengthwise edge margin of the asymmetrical arm portion. As will be explained in further detail below, the asymmetrical shape of the asymmetrical arm portion 26 can cause the delivery system 10 to glide or spin as it descends, depending on the configuration of the control arm portion 24.

The control arm portion 24 is connected to the control unit 14 by three long lines 38 and the control line 34. In certain embodiments, the control arm portion can be connected to a base by other numbers of long lines in addition to a control line. The control line 34 is connected to the control arm portion 24 at the corner region located immediately adjacent to the asymmetrical arm portion 24, and the three long lines 38 are connected to the end margin of the control arm portion at connection points spaced apart widthwise of the arm portion. More specifically, the control line 34 and the short line 36 are connected to the control arm portion 24 and the asymmetrical arm portion 26, respectively, at immediately adjacent corner regions thereof.

As will be explained in further detail below, the control unit 14 is configured to selectively adjust a length CL of the control line 34 to any length within a length adjustment range LAR that includes a minimum length $CL_{MIN}$ and a maximum length $CL_{MAX}$. In the illustrated embodiment, the minimum control line length $CL_{MIN}$ is less than the length SL of the short line 36, and the maximum control line length $CL_{MAX}$ is greater than the length of the short line. In one or more embodiments, the maximum control line length $CL_{MAX}$ is also greater than the long line length LL. Accordingly, the illustrated control unit 14 is configured to selectively adjust the control line 34 to have at least one length CL that is less than the length SL of the short line 36 (e.g., $CL_{MIN}$), a length that is the same as the length as the short line, and at least one length that is greater than the length of the short line (e.g., $CL_{MAX}$).

When the parachute 12 is deployed and the control unit 14 adjusts the length CL of the control line 34 to be about the same as the length SL of the short line 36, the control arm 24 is deformed by drag to have a shape that is a substantial mirror image of the shape of the asymmetrical arm rotated 90° about the vertical axis VA. In this configuration, the parachute 12 will glide generally in a heading direction HD indicated in FIG. 2 as it descends. Hence, in one or more embodiments, the control unit 14 is configured to selectively adjust the length CL of the control line 34 to be about the same as the length SL of the short line 34 when the parachute 12 has yawed so that the heading direction HD points generally toward the target location.

When the parachute 12 is deployed and the control unit 14 adjusts the length CL of the control line 34 to be less than the length of the short line 36 (e.g., the minimum length $CL_{MIN}$), the control 24 arm is deformed by drag to have a different shape that causes the parachute 12 to rotate or spin about the vertical center axis VA in a first rotational direction RD1. Similarly, when the parachute 12 is deployed and the control unit 14 adjusts the length of the control line 34 to be greater than the length of the short line 36 (e.g., the maximum length CLmAx), the control 24 arm is deformed by drag to have yet another shape that causes the parachute 12 to rotate or spin about the vertical center axis VA in a second rotational direction RD2 opposite the first rotational direction RD1. Thus, the control unit 14 can adjust the length CL of the control line 34 to be less than or greater than the length SL of the short line 36 to cause the parachute 12 to spin about the vertical axis VA. As will be explained in further detail below, causing the delivery system 10 to spin serves two purposes. First, spinning the delivery system 10 about the vertical axis VA changes where the heading direction HD 12 points, and hence the control unit 14 can spin or yaw the parachute about the axis until the heading direction points generally toward the target location. Second, spinning the parachute about the vertical axis VA causes the delivery system to descend substantially vertically subject to wind. For example, in one or more embodiments, the spinning causes the delivery system to spiral vertically downward subject to wind.

Figure 3:
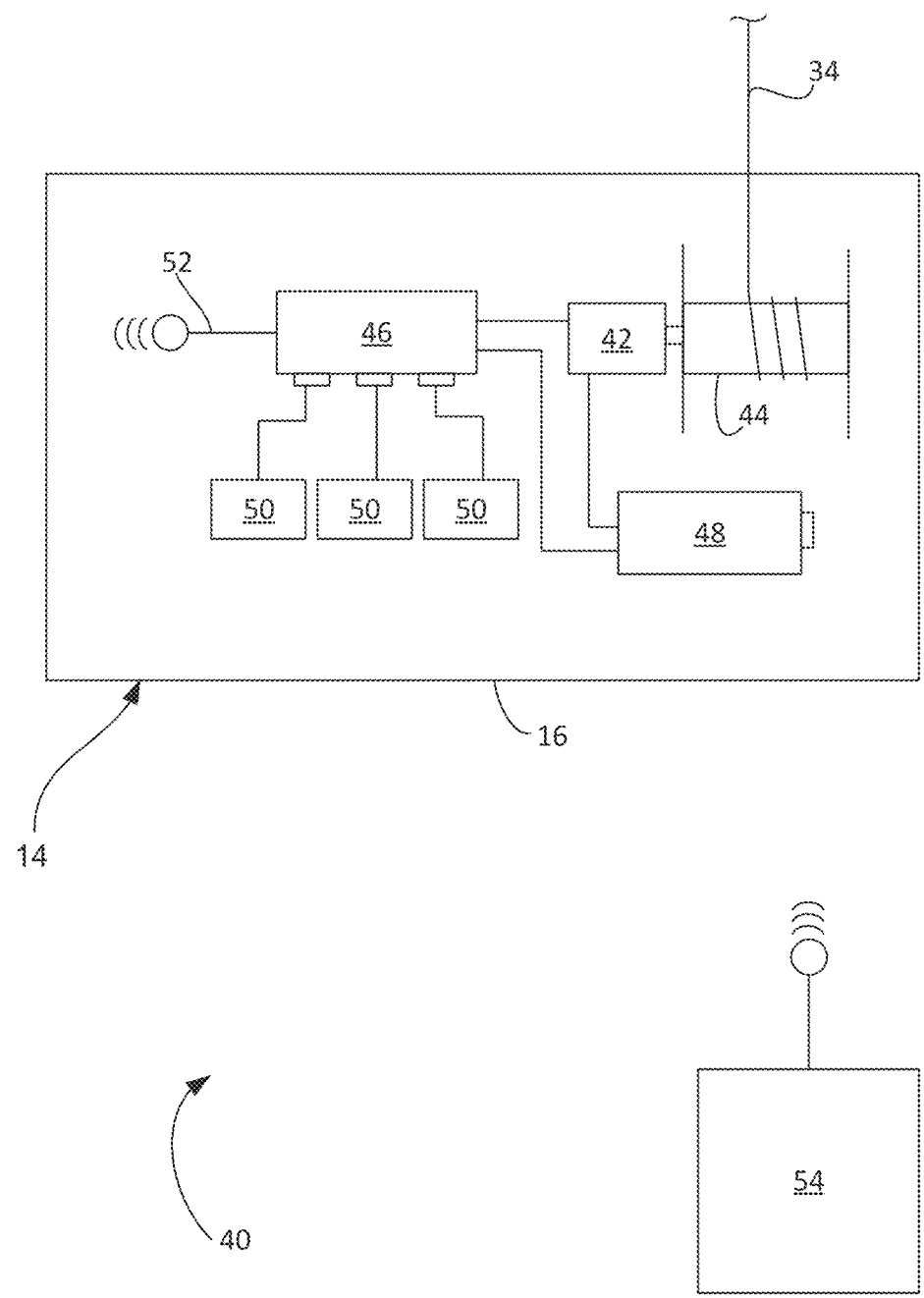
FIG. 3 is a schematic block diagram of a control unit of the aerial delivery system.

Referring to FIG. 3, the control unit 14 comprises a control system 40 that is generally configured to adjust the length of the control line 34 to control movement of the delivery system 10 as it descends from the elevated location. In one or more embodiments, the control unit 14 comprises an actuator 42 that is operatively connected to the control line 34 to selectively adjust the length CL of the control line. In the illustrated embodiment, the actuator 42 comprises a servo motor that drives a winch 44 to selectively increase and decrease the length CL of the control line 34. It will be understood, however, that other types of actuators can be used to drive a winch or adjust the length of a control line in other ways, in one or more embodiments. In the illustrated embodiment, the actuator 42 and the winch 44 are each received in the control unit enclosure 16, and a portion of the control line 34 extends through an opening in the enclosure onto the winch. The actuator and winch can be supported on a base of a delivery system in other ways in other embodiments.

The illustrated control system 40 further comprises an onboard microcontroller 46 and power supply 48 received in the enclosure 16. The actuator 42 is operatively connected to the power supply 48 to draw power from the power supply to rotate the winch 44. In one or more embodiments, the microcontroller 46 is operatively connected to the actuator 42 to selectively actuate the actuator to drive the winch 44. The illustrated microcontroller 46 comprises a plurality of data inputs, and the control system 40 comprises one or more onboard sensors 50 (broadly, navigation data inputs) that are operatively connected to the data inputs. In an exemplary embodiment, the sensors 50 comprise one or more of a GPS receiver, a rate gyroscope, an accelerometer, a magnetometer, and a barometric pressure transducer. The sensors 50 are operatively connected to the micro controller 46 to transmit respective navigation signals to the microcontroller. The control system 40 is generally configured to use the navigation signals to control the actuator 42 and thereby control movement of the delivery system 10 as it descends. In one or more embodiments, the control system 40 uses a PID controller to control the actuator 42 based on one or more navigation signals.

In certain embodiments, the control system 40 comprises a wireless transceiver 52 (e.g., an RF transceiver) that provides wireless communication between the microcontroller 46 and a remote controller 54. In one or more embodiments, the remote controller 54 can be configured to wirelessly transmit control signals to the microcontroller 46 that the microcontroller uses to control the actuator 42. Thus, the actuator 42 can be controlled at the direction of the remote controller 54. However, in one or more embodiments, control directives can also initiate from the onboard microcontroller 46. When the remote controller 54 is used, the microcontroller 46 can be configured to transmit the navigation signals received from the onboard sensors 50 to the remote controller 54 using the wireless transceiver 52. In one embodiment, the remote controller 54 is configured to display or otherwise indicate the received navigation signals to a human operator and the remote controller is configured to receive control inputs from the operator through a user input device (not shown) by which the operator controls the actuator 42. In another embodiment, the remote controller 54 includes an automated control processor (not shown) configured to process the navigation signals to automatically control the actuator 42.

In an exemplary embodiment, an automated control processor at either the remote controller 54 or onboard the control unit 14 (e.g., the microcontroller 46) controls the actuator 52 by remote PID control inputs based on one or more of the navigation signals received from the sensors 50 and/or other sources. The remote controller 54 and/or microcontroller 46 can also be configured to receive additional navigation signals from other sources (not shown). For example, it is expressly contemplated that in certain embodiments the remote controller 54 and/or the microcontroller 46 receives an indication of wind conditions at or near the location of the delivery system 10 from a remote source (e.g., a remote wind sensor, a weather station, etc.).

The delivery system 10 can be used to deliver a payload P from an elevated location (e.g., an airplane, helicopter, or balloon in flight) to a target location below. In one or more embodiments of a method of delivering the payload P to the target location, the payload P is connected to the control unit enclosure 16 so that the payload can be supported by the delivery system 10 as it descends from the elevated location to the target location. At the appropriate time, the delivery system 10 is released from the elevated location with the payload P supported by the control unit enclosure 16. In an exemplary embodiment, the delivery system is released at a calculated aerial release point (CARP) for a given target location, e.g., the release point from which an unguided parachute would be expected to land at the target location based on predicted wind conditions. The delivery system 10 can also be released from a location that is offset from the CARP in one or more embodiments. The parachute 12 automatically deploys to the open configuration (FIG. 1) after the delivery system 10 is released. In one or more embodiments, the control line 34 is initially set to have a length CL that differs from the length SL of the short line 36. Thus, after being deployed, the parachute 12 begins to spin about the vertical axis VA.

Based on navigation signals received from the onboard sensors 50 and/or navigation signals received from external sources (e.g., an indication of wind conditions), the control system 40, either automatically or in response to a user input, directs the actuator 42 to adjust the length CL of the control line 34 to be about the same as the length SL of the short line 36, which causes the parachute to begin a glide phase in which the parachute glides in the heading direction HD. For example, an operator or an automated control processor uses the navigation signals to determine when the heading direction HD of the spinning parachute 12 will point in the general direction of the target location. And based on this determination, at the appropriate time, the operator or automated control processor directs the actuator 42 to adjust the length CL of the control line 34 to be about the same as the length SL of the short line 36 so that the heading direction HD points generally in the direction of the target location.

During the glide phase, the automated control processor or the operator can provide control inputs that cause the actuator 42 to make minor adjustments to the control line length CL to maintain the heading direction. For example, a PID control scheme can be used to maintain the heading direction during the glide phase. In certain embodiments, the parachute 12 can be controlled so that the heading direction HD oscillates within a limited angular range of motion about the intended heading direction. In one or more embodiments, the human operator or control processor accounts for the effects of wind conditions when setting the heading direction HD during the glide phase. After the glide phase has begun, the parachute 12 glides generally toward the target location. In other words, the parachute moves in latitude and longitude toward the target location as it descends. If wind causes the parachute 12 to drift off course during the glide phase, the control line length CL can be adjusted to cause the parachute to spin (e.g., by making the control line length differ from the short line length SL). The parachute 12 is permitted to spin until the heading direction HD again points in the direction of the target location, at which point the parachute is returned to the glide phase.

Based on navigation signals from the onboard sensors 50 and/or navigation signals received from external sources, the control system 40 determines when the delivery system 10 glides to a location generally above the target location (e.g., an aerial location spaced above the target location at which the delivery system is generally aligned with the target location in latitude and longitude). Alternatively, a user may determine when the delivery system 10 is in a location generally above the target location. When this determination is made, the control system 40, either automatically or in response to user input, causes the parachute 12 to begin a spiraling down phase (broadly, a vertical descent phase) in which the delivery system spirals vertically downward (broadly, descends substantially vertically) subject to wind. To begin the spiraling down phase, the controller 54 directs the actuator 42 to adjust the length CL of the control line 34 to be greater than or less than the short line length SL. In response, the parachute 12 spins about the vertical axis VA, and substantially all gliding motion is stopped. In one or more embodiments, the parachute spirals vertically downward generally without net movement in the longitudinal direction or latitudinal direction, except for longitudinal/latitudinal movement which is attributable to wind. In certain embodiments, the operator or automated control processor uses an indication of wind conditions to determine when to begin the spiraling down phase, accounting for the effect that wind will have on the movement of the delivery system 10 as the parachute 12 spirals down. For example, the operator or automated control processor begins the spiraling down phase when the delivery system 10 is in a location in which it will land generally at the target location after spiraling down subject to wind.

If wind causes the parachute 12 to drift off course during the spiraling down phase, the controller 54 can return the parachute 12 to the glide phase at the appropriate time so that the parachute glides toward the target location. Again, when the parachute 12 glides to a location generally above the target, the controller adjusts the control line length CL to be greater than or less than the short line length SL to cause the parachute 12 to return to the spiraling down phase. The process of switching between the glide phase and the spiraling down phase can be repeated until the delivery system spirals down to land generally at the target location.

As can be seen, the aerial delivery system 10 selectively introduces asymmetries into a cruciform parachute canopy 20 using a single actuator 42 to guide a payload from an elevated location to a target location. Using a single actuator with a cruciform canopy provides a low-cost way of enhancing the accuracy of payloads delivered by aerial drop.

EXAMPLES

As explained in attachments B, C, and D of U.S. Provisional Patent Application Ser. No. 62/638,514, which were previously expressly incorporated by reference into the present disclosure, an example of a delivery system 10 was constructed and subjected to test drops between June 2016 and March 2017. During one subset of the test drops, a simple staircase input was used to control the length of the control line using the control line actuator. During another subset of test drops, a multi-sine input was used to the control the length of the control line using the line actuator. Based on data from onboard sensors it was determined that changes in control line length (e.g., the changes induced by the staircase input and the multi-sine input) correlate highly to the yaw rate of the delivery system as it descends.

During another subset of test drops the delivery system was controlled using a PID controller to maintain a fixed heading. And during yet another subset of test drops, the delivery system was controlled using a PID controller to make 90° oscillatory turns every 30 seconds as the system descended. The results indicated that it was possible to control the heading of the delivery system using PID control of the single actuator. The PID controller developed at the time of testing was able to maintain a fixed heading direction within an oscillatory angular range of ±20°.

Finally a subset of test drops were conducted in which the delivery system was controlled to maintain a fixed heading. During this subset of test drops, a GPS logger was used to determine the ground track path and wind velocity as the system descended. Based on this data, it was found that the delivery system had an average realized glide ratio of 0.17. However, after accounting for glide energy expended by angular oscillations, it was determined that the delivery system displayed an average actual glide ratio of 0.34.

Using flight data from the test drops, a dynamic simulation model was developed for the guided aerial delivery system based on the PID controller that was used during the test drops. A large number of simulations were conducted that simulated the landing locations of the guided aerial delivery system and an unguided aerial delivery system, each dropped from a calculated aerial release point (CARP) for a given target location. The simulations assumed that the actual wind conditions differed from the predicted wind conditions by various amounts. When the simulated actual wind conditions differed from the simulated predicted wind conditions by less than 2.3 m/s, the guided system had a 50% Circular Error Probable (CEP) of 14 m, whereas the unguided system had a 50% CEP of 64 m. When the simulated actual wind conditions differed from the simulated predicted wind conditions by from 2.3 m/s to 4.6 m/s, the guided system had a 50% CEP of 68 m, whereas the unguided system had a 50% CEP of 174 m. When the simulated actual wind conditions differed from the simulated predicted wind conditions by from 4.6 m/s to 7 m/s, the guided system had a 50% CEP of 244 m, whereas the unguided system had a 50% CEP of 372 m. Thus overall, the simulated guided system showed substantial improvements in landing location accuracy. Moreover, it is believed that with advancements in the heading control system, the landing location accuracy of the guided system can be further improved.

Overall the experimental and simulation results based on the test delivery systems show that a cruciform parachute can be controlled to selectively glide and spin using a single actuator.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. An aerial payload delivery system for delivering a payload released from an elevated location to a target location below the elevated location, the delivery system comprising:
   a base configured to support the payload as the delivery system descends from the elevated location;
   a cruciform parachute canopy configured to be deployed to an open configuration as the payload delivery system descends from the elevated location;
   a plurality of suspension lines connecting the base to the canopy to suspend the base from the canopy when the canopy is deployed to the open configuration, each of the suspension lines having a length extending from the base to the cruciform parachute canopy, the plurality of suspension lines including a control line; and
   a control system comprising an actuator operatively connected to the control line to selectively adjust the length of the control line.

2. The delivery system as set forth in claim 1, wherein the actuator comprises a servo motor.

3. The delivery system as set forth in claim 1, wherein the cruciform parachute canopy includes a central portion and a plurality of arm portions extending outward from the central portion in different directions, each of the plurality suspension lines being connected to one of the plurality of arm portions.

4. The delivery system as set forth in claim 3, wherein the plurality of suspension lines includes the control line, a short line, and a plurality of long lines, the length of each of the long lines being greater than the length of the short line.

5. The delivery system as set forth in claim 4, wherein the plurality of arm portions includes a control arm portion connected to the base by the control line and at least one of the long lines; first and second symmetrical arm portions, each connected to the base by at least two long lines and an asymmetrical arm portion connected to the base by the short line and at least one long line.

6. The delivery system as set forth in claim 5, wherein each arm portion extends outward from the central portion to a free end margin and each arm portion includes opposite corner regions at the respective free end margin, at least one of the plurality of suspension lines being connected to each corner region of each of the plurality of arm portions.

7. The delivery system as set forth in claim 6, wherein the control line and the short line are connected to the control arm portion and the asymmetrical arm portion, respectively, at immediately adjacent corner regions thereof.

8. The delivery system as set forth in claim 4, wherein the control system is configured to selectively control the actuator to adjust the length of the control line to be about the same as the length of the short line to cause the delivery system to glide as it descends.

9. The delivery system as set forth in claim 8, wherein the control system comprises a controller configured to automatically direct the actuator to adjust the length of the control line to be about the same as the length of the short line to cause the payload delivery system to glide toward the target location as it descends.

10. The delivery system as set forth in claim 9, wherein the controller is configured to receive an indication of wind conditions as the delivery system descends from the elevated location and wherein the controller is configured to use the indication of the wind conditions to determine when to automatically direct the actuator to adjust the length of the control line to be about the same as the length of the short line.

11. The delivery system as set forth in claim 4, wherein the control system is configured to selectively control the actuator to adjust the length of the control line to be different than the length of the short line to cause the delivery system to descend substantially vertically subject to wind.

12. The delivery system as set forth in claim 11, wherein the control system comprises a controller configured to automatically direct the actuator to adjust the length of the control line to be different than the length of the short line to cause the payload delivery system to descend substantially vertically subject to wind onto the target location.

13. The delivery system as set forth in claim 12, wherein the controller is configured to receive an indication of wind conditions as the delivery system descends from the elevated location and wherein the controller is configured to use the indication of the wind conditions to determine when to automatically direct the actuator to adjust the length of the control line to be different than the length of the short line.

14. The delivery system as set forth in claim 4, wherein the control system is configured to selectively control the actuator to adjust the length of the control line to be greater than the length of the short line to cause the delivery system to rotate about a vertical axis.

15. The delivery system as set forth in claim 1, wherein the actuator is configured to control yaw of the delivery system by adjusting the length of the control line.

16. The delivery system as set forth in claim 1, wherein the control system comprises a controller wirelessly connected to the actuator for controlling the actuator from a remote location as the aerial payload delivery descends from the elevated location.

17. The delivery system as set forth in claim 1, wherein the control system comprises a microcontroller and a power supply supported on the base and operatively connected to the actuator.

18. The delivery system as set forth in claim 17, wherein the microcontroller comprises a programmable microprocessor having at least one data input, the control system further comprising at least one navigation data input device connected to the at least one data input, the at least one navigation data input device being at least one of a GPS receiver, a rate gyroscope, an accelerometer, a magnetometer, and a barometric pressure transducer.

19. The delivery system as set forth in claim 1, wherein the base comprises an enclosure that encloses at least a portion of the control system.

20. A method of guiding a payload from an elevated location to a target location below the elevated location, the method comprising:
    deploying a cruciform parachute from the elevated location, the payload being connected to the cruciform parachute;
    adjusting a length of a control line of the cruciform parachute that connects a canopy of the cruciform parachute to a base to set the cruciform parachute on a glide path toward the target location; and
    adjusting the length of the control line to cause the cruciform parachute to rotate about a vertical axis when the cruciform parachute is located generally above the target location such that the cruciform parachute will descend substantially vertically generally onto the target location.

21. The delivery system as set forth in claim 18, wherein the at least one navigation data input device comprises a rate gyroscope.

22. The delivery system as set forth in claim 1, wherein the actuator is a single actuator and the control system is configured to guide the aerial payload delivery system using only the single actuator to adjust the cruciform parachute canopy.

23. The delivery system as set forth in claim 1, wherein the control system is configured to guide the aerial payload delivery system solely by adjusting one corner region of one of the arm portions of the cruciform parachute canopy.

* * * * *